(12) United States Patent
Lu et al.

(10) Patent No.: US 11,284,013 B2
(45) Date of Patent: Mar. 22, 2022

(54) COLOR DETECTION METHOD AND TERMINAL

(71) Applicant: Huawei Technologies Co., Ltd., Shenzhen (CN)

(72) Inventors: Henghui Lu, Beijing (CN); Hao Liu, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 16/627,636

(22) PCT Filed: Jun. 30, 2017

(86) PCT No.: PCT/CN2017/091172
§ 371 (c)(1),
(2) Date: Dec. 30, 2019

(87) PCT Pub. No.: WO2019/000409
PCT Pub. Date: Jan. 3, 2019

(65) Prior Publication Data
US 2020/0374447 A1    Nov. 26, 2020

(51) Int. Cl.
*H04N 5/235* (2006.01)
*G06T 7/90* (2017.01)
(Continued)

(52) U.S. Cl.
CPC .......... *H04N 5/2354* (2013.01); *G06T 5/009* (2013.01); *G06T 7/90* (2017.01); *H04N 5/2256* (2013.01);
(Continued)

(58) Field of Classification Search
CPC .. H04N 5/2354; H04N 5/2256; H04N 5/2351; H04N 1/6086; H04N 9/04;
(Continued)

(56) References Cited

U.S. PATENT DOCUMENTS

| 4,146,394 A | 3/1979 | Levy et al. |
| 7,636,473 B2 * | 12/2009 | Imai ..................... H04N 1/6077 |
| | | 348/223.1 |

(Continued)

FOREIGN PATENT DOCUMENTS

| CN | 101635053 A | 1/2010 |
| CN | 101998131 A | 3/2011 |

(Continued)

OTHER PUBLICATIONS

Niu, J., et al., "A Novel Color Correction Framework for Facial Images," International Conference on Medical Biometrics, 2014, pp. 47-54.

(Continued)

*Primary Examiner* — Chiawei Chen
(74) *Attorney, Agent, or Firm* — Conley Rose, P.C.

(57) ABSTRACT

A terminal device calibrates a to-be-detected image based on a light source color temperature and scene brightness that are obtained during imaging of the to-be-detected image and based on a preset reference color card image set to restore a real color of the to-be-detected image to a greatest extent.

20 Claims, 5 Drawing Sheets

(51) Int. Cl.
*G06T 5/00* (2006.01)
*H04N 5/225* (2006.01)

(52) U.S. Cl.
CPC . *H04N 5/2351* (2013.01); *G06T 2207/10024* (2013.01)

(58) Field of Classification Search
CPC ...... H04N 9/735; H04N 1/6033; H04N 5/235; H04N 17/002; G06T 5/009; G06T 7/90; G06T 2207/10024; G06T 7/0012; G06T 2207/30088; H04M 1/72454
See application file for complete search history.

(56) References Cited

U.S. PATENT DOCUMENTS

| | | | |
|---|---|---|---|
| 8,144,209 B2* | 3/2012 | Takeuchi | H04N 9/735 348/223.1 |
| 2003/0112334 A1* | 6/2003 | Kiyokawa | H04N 1/603 348/207.1 |
| 2005/0213128 A1 | 9/2005 | Imai et al. | |
| 2008/0101693 A1 | 5/2008 | Young et al. | |
| 2011/0037829 A1 | 2/2011 | Hata | |
| 2014/0267782 A1* | 9/2014 | Liu | H04N 9/735 348/187 |
| 2015/0049222 A1* | 2/2015 | Yeh | H04N 9/735 348/242 |
| 2020/0324711 A1* | 10/2020 | Brouwer | B60R 11/02 |

FOREIGN PATENT DOCUMENTS

| | | |
|---|---|---|
| CN | 102137272 A | 7/2011 |
| CN | 102184527 A | 9/2011 |
| CN | 102509318 A | 6/2012 |
| CN | 102867295 A | 1/2013 |
| CN | 103152476 A | 6/2013 |
| CN | 103268618 A | 8/2013 |
| CN | 103630240 A | 3/2014 |
| CN | 103686111 A | 3/2014 |
| CN | 103796003 A | 5/2014 |
| CN | 103139591 B | 3/2016 |
| CN | 106162136 A | 11/2016 |
| CN | 106683140 A | 5/2017 |

OTHER PUBLICATIONS

Marguier, J., et al., "Assessing Human Skin Color from Uncalibrated Images", J. Imag. Syst. Tech, vol. 17, 2007, pp. 144-151.
"Chinese medicine color diagnosis," retrieved from: https://zhuanlan.zhihu.com/p/38659671, Jun. 29, 2018, 41 pages.
Zhao, C., et al., "Facial Color Management for Mobile Health in the Wild," IEEE Transactions on Nanobioscience, vol. 15, No. 4, Jun. 2016, pp. 316-327.
"Light Meter Free—Old camera auxiliary metering application (iPhone)," retrieved from:https://www.appinn.com/light-meter-free-iphone/, Dec. 20, 2013, 9 pages.
Plowden, A., "LightSpectrum Pro App—a Quick and Easy Colour Temperature Calculator," retrieved from:https://www.cinema5d.com/lightspectrum-pro-app-a-quick-and-easy-colour-temperature-calculator/, May 9, 2018, 5 pages.
Bhatti, N., et al., "Mobile Cosmetics Advisor: An Imaging Based Mobile Service," SPIE Proc., 2010, 11 pages.
"This app makes your phone a color temperature meter," retrieved from: https://t.cj.sina.com.cn/articles/view/2518004507/9615b31b001001908, Mar. 21, 2017, 11 pages.

* cited by examiner

| Light source type | Light source color temperature | Scene brightness | Reference color card image |
|---|---|---|---|
| Candlelight | 1000 K | Brightness 1 | Image 1 |
| W-filament bulb | 2000 K | Brightness 2 | Image 2 |
| Household bulb (60 watts) | 2500 K | Brightness 3 | Image 3 |
| Floodlight | 3200 K | Brightness 4 | Image 4 |
| Quartz lamp | 3300 K | Brightness 5 | Image 5 |
| Department store modeling lamp | 3400 K | Brightness 6 | Image 6 |
| Warm color fluorescent lamp | 3500 K | Brightness 7 | Image 7 |
| White cold light tube | 4500 K | Brightness 8 | Image 8 |
| Afternoon sunshine | 4000 K | Brightness 9 | Image 9 |
| Flash lamp | 5000 K | Brightness 10 | Image 10 |
| Midday sunshine | 5500 K | Brightness 11 | Image 11 |
| Daylight | 5600 K | Brightness 12 | Image 12 |
| Sunshine on a sunny day | 6000 K | Brightness 13 | Image 13 |
| Sunshine on a cloudy day | 7000 K | Brightness 14 | Image 14 |
| Dim sky | 8000 K | Brightness 15 | Image 15 |
| Blue sky on a cloudy day | 9000 K | Brightness 16 | Image 16 |
| Blue sky on a sunny day | 10000 K | Brightness 17 | Image 17 |
| Sunshine in waters | 20000 K | Brightness 18 | Image 18 |

FIG. 3

COLOR DETECTION METHOD AND TERMINAL

CROSS-REFERENCE TO RELATED APPLICATIONS

This application is a National Stage of International Application No. PCT/CN2017/091172 filed on Jun. 30, 2017, which is hereby incorporated by reference in its entirety.

TECHNICAL FIELD

This application relates to the field of image processing technologies, and in particular, to a color detection method and terminal.

BACKGROUND

Color detection appears in all aspects of life, and relatively typical color detection is complexion detection. In daily life, complexion detection may be widely applied to various industries. For example, complexion detection is applied to the apparel industry, to be specific, a complexion status of a user is obtained through complexion detection and an accurate apparel color matching suggestion is provided based on a complexion of the user; complexion detection is applied to the cosmetics industry, to be specific, a correct foundation color, a correct eye shadow color, a correct lipstick color, and the like are selected for a user based on a complexion of the user; complexion detection may also be applied to the health industry, to be specific, a current skin status of a user is determined based on a complexion of the user, then some skin care suggestions may be provided, and some feasible disease prevention suggestions may also be provided.

The following uses complexion detection as an example to describe several common color detection implementation methods.

Generally, in complexion detection, an image of to-be-detected skin is first obtained based on a graphics and image processing technology, and then a to-be-detected skin region in the image is detected to calculate a complexion value. However, there is usually a given color difference between the image of the to-be-detected skin and real skin due to impact of an illumination condition used during imaging. Therefore, if a color of the image of the to-be-detected skin is used as a complexion detection result, an error inevitably exists in the result.

Currently, to resolve a problem of a color difference between an image complexion and a real complexion due to an illumination condition used during imaging, common complexion detection methods are an image-statistics-based method and a color-card-based method, and are specifically as follows:

1. Image-Statistics-Based Method

A basic principle is to estimate, by using a mathematical statistics algorithm, a color of an illumination light source used during imaging, and then remove impact of the light source, to restore a real color of an image to a greater extent.

This method is widely applied. However, from a mathematical point of view, separating an illumination component and an intrinsic component from a single input image is an ill-conditioned problem that is relatively difficult to resolve. Currently, this manner can be usually applied to complexion detection only in a relatively simple and coarse-grained scenario, and cannot achieve a relatively good detection effect for a scenario in which a real color needs to be precisely restored.

2. Color-Card-Based Method

A standard color card is placed near to-be-detected skin, an image of the to-be-detected skin and the standard color card is taken, a color of the entire image is calibrated based on a relationship between a color of the color card in the image and a real color of the color card, and then a skin region in a calibrated image is detected to calculate a complexion value.

For the color-card-based complexion detection method, accuracy of a detection result is relatively high. However, a color card needs to be used each time complexion is measured. This requires a user to carry a color card any time for photographing, which is inconvenient.

In conclusion, no existing color detection method, regardless of the image-statistics-based method or the color-card-based method, can ensure both accuracy and convenience.

SUMMARY

Embodiments of this application provide a color detection method and terminal, to resolve a prior-art problem that no existing color detection method can ensure both accuracy and convenience.

Specific Technical Solutions Provided in this Application are as Follows:

According to a first aspect, an embodiment of this application provides a color detection method, where the method includes: obtaining, by a terminal, a light source color temperature and scene brightness that are used during imaging of a to-be-detected image; selecting, by the terminal, a reference color card image from a preset reference color card data set in the terminal based on the obtained light source color temperature and a correspondence between a light source color temperature used during imaging of a reference color card image and the reference color card image; determining, by the terminal, target image brightness of the to-be-detected image based on the scene brightness used during imaging of the to-be-detected image and based on a preset functional relationship between image brightness and scene brightness; adjusting, by the terminal, brightness of the selected reference color card image to the target image brightness, and using an adjusted reference color card image as a calibration color card image; and calibrating, by the terminal, the to-be-detected image based on a prestored relationship between a color of a standard color card image and a color of the calibration color card image, and determining a color value of a calibrated to-be-detected image.

According to the foregoing method, during color detection, the terminal needs to calibrate the to-be-detected image. In the calibration process, color calibration information needs to be determined based on the relationship between the color of the calibration color card image related to the light source color temperature and the scene brightness that are used during imaging of the to-be-detected image and the color of the standard color card image, to ensure that the calibrated to-be-detected image is less affected by an imaging environment and is a to-be-detected image close to a real color, so that the finally determined color value is closer to a real value. In the entire color detection process, parameters required by the terminal are the light source color temperature and the scene brightness that are used during imaging of the to-be-detected image, and no additional operations need to be performed by a user, thereby further improving convenience in color detection.

In a possible design, the terminal may perform selection from the reference color card data set in many manners. The terminal may perform selection based on the scene brightness used during imaging of the to-be-detected image, or may perform selection based on the color temperature used during imaging of the to-be-detected image.

The Following Provides Two Manners for Selecting the Reference Color Card Image Based on the Color Temperature Used During Imaging of the to-be-Detected Image:

In manner 1, the terminal selects, from the preset reference color card data set, a reference color card image for which a light source color temperature used during imaging of the reference color card image is closest to the obtained light source color temperature.

In manner 2, the terminal selects, from the preset reference color card data set, at least one reference color card image, and selects one reference color card image from the at least one reference color card image, where a difference between a light source color temperature used during imaging of the at least one reference color card image and the obtained light source color temperature is within a specified threshold range.

According to the foregoing method, the light source color temperature is a main factor affecting an image color. The terminal preferentially selects the reference color card image from the reference color card data set based on the obtained color temperature. A selection criterion is determined based on that the obtained color temperature and a light source color temperature of the reference color card image satisfy a preset relationship, so that the selected reference color card image is related to the color temperature used during imaging of the to-be-detected image.

In a possible design, the preset functional relationship between image brightness and scene brightness may be a common functional relationship between image brightness and scene brightness, or may be a functional relationship between image brightness and scene brightness for a type of image. An optimum functional relationship between image brightness and scene brightness may be obtained by analyzing a correspondence between scene brightness used during imaging of each reference color card image in the preset reference color card data set and image brightness of each reference color card image in the preset reference color card data set.

According to the foregoing method, the terminal determines the functional relationship between image brightness and scene brightness by analyzing the correspondence between scene brightness used during imaging of each reference color card image and image brightness of each reference color card image. The obtained functional relationship is more applicable to brightness adjustment of the reference color card image, thereby improving accuracy of target brightness of the to-be-detected image.

In a possible design, the terminal determines color calibration information based on a color value of a color block in each same position of the prestored standard color card image and the calibration color card image, where the color calibration information represents a mapping relationship between a color value of the standard color card image and a color value of the calibration color card image; and the terminal calibrates a color of the to-be-detected image based on the color calibration information.

According to the foregoing method, the calibration color card image is related to an environment used during imaging of the to-be-detected image. Therefore, the color calibration information required for calibrating the to-be-detected image can be determined based on the color value of the color block in each same position of the standard color card image and the calibration color card image. In this calibration manner, a real color of the to-be-detected image can be restored to a greater extent, to remove impact of a light source color temperature and scene brightness in a photographing scene on the color of the to-be-detected image to a greatest extent.

In a possible design, the terminal determines the color value of the calibrated to-be-detected image based on a color value of each pixel of the calibrated to-be-detected image.

According to the foregoing method, the terminal determines the color value by using the calibrated to-be-detected image, and the determined color value is relatively close to a real value.

According to a second aspect, an embodiment of this application further provides a terminal. The terminal has a function of implementing behavior of the terminal in the foregoing method example. The function may be implemented by hardware, or may be implemented by hardware executing corresponding software. The hardware or software includes one or more modules corresponding to the foregoing function.

In a possible design, a structure of the terminal includes an obtaining unit and a processing unit. These units may perform corresponding functions in the foregoing method example. Refer to the detailed description in the method example, and details are not described herein again.

In a possible design, a structure of the terminal includes a processor and a memory. The processor is configured to support the terminal in performing a corresponding function in the foregoing method. The memory is coupled to the processor, and stores a program instruction and data that are necessary for the terminal.

According to a third aspect, an embodiment of this application further provides a computer storage medium. The storage medium stores a software program. The software program may be read and executed by one or more processors to implement the method provided in any one of the first aspect or the designs of the first aspect.

According to a fourth aspect, an embodiment of this application further provides a computer program product including an instruction. When the computer program product runs on a computer, the computer is enabled to execute the method provided in any one of the first aspect or the designs of the first aspect.

In the embodiments of this application, when processing the to-be-detected image, the terminal determines the calibration color card image based on the light source color temperature and the scene brightness that are used during imaging of the to-be-detected image, and calibrates the to-be-detected image based on the relationship between the color of the standard color card image and the color of the calibration color card image, to restore a real color of the to-be-detected image, so that the final color value is closer to a real value. This can effectively improve color detection accuracy. In the entire color detection process, the terminal only needs to determine the light source color temperature and the scene brightness that are used during imaging of the to-be-detected image, to complete calibration of the to-be-detected image, and a user does not need to prepare a color card, thereby improving convenience in color detection.

BRIEF DESCRIPTION OF DRAWINGS

FIG. 3 is a schematic structural diagram of a reference color card data set according to an embodiment of this application;

DESCRIPTION OF EMBODIMENTS

Figure 1:
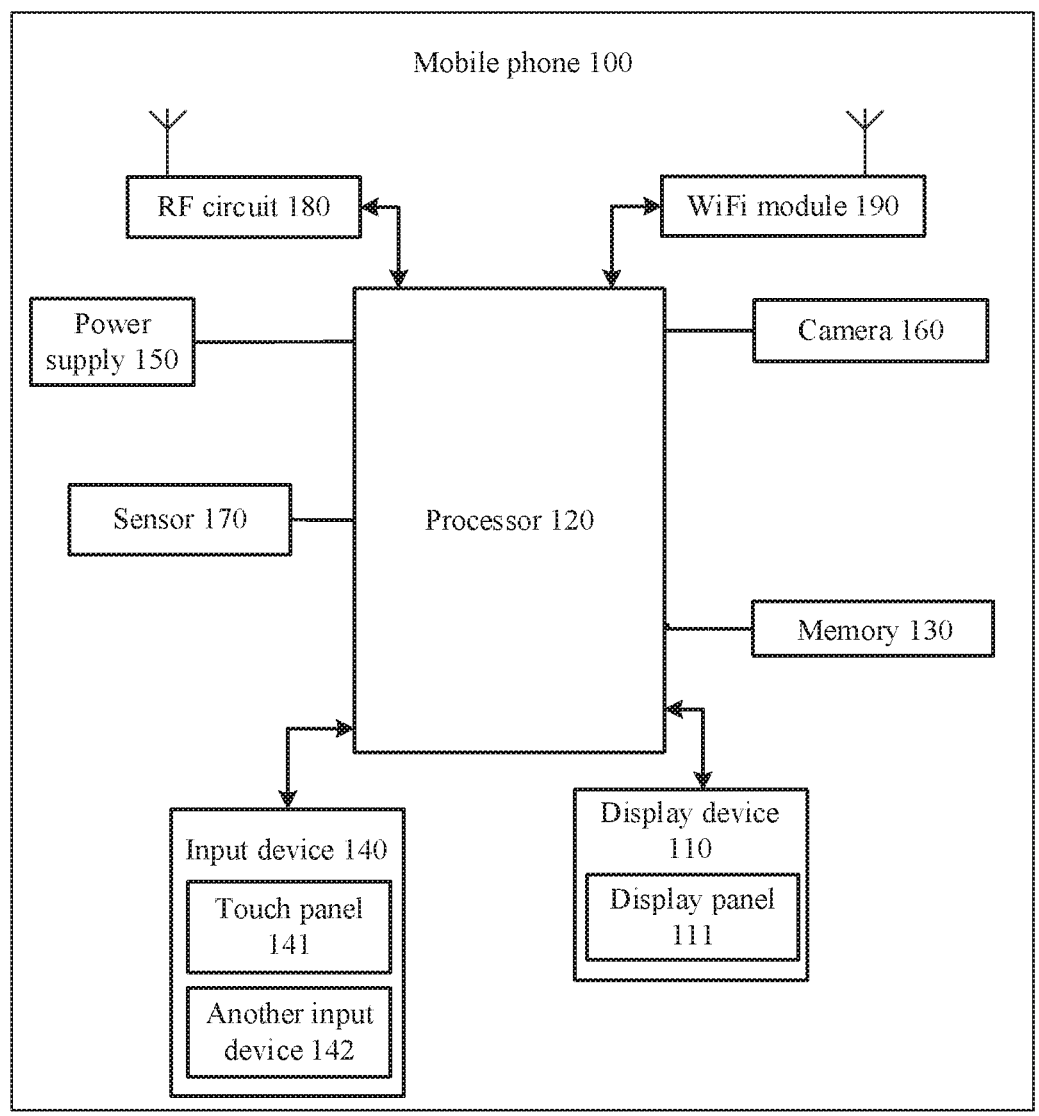
FIG. 1 is a schematic structural diagram of a terminal according to an embodiment of this application.

This application provides a color detection method and terminal, so that a terminal calibrates a to-be-detected image based on a light source color temperature and scene brightness that are obtained during imaging of the to-be-detected image and a prestored reference color card image set, to restore a real color of the to-be-detected image to a greatest extent. In this way, a color value of the to-be-detected image can be obtained more accurately.

First, some terms in this application are described, so as to help a person skilled in the art have a better understanding.

(1) A terminal, which may also be referred to as a device, is a terminal that can communicate with another device or that is capable of detecting scene brightness and a light source color temperature and obtaining an image. For example, the terminal may be a smartphone, tablet computer, wearable device, in-vehicle device, computer, or digital camera that has a camera.

(2) A light source color temperature is a physical quantity that describes a color of a main light source used during imaging of an image, and is related to a type of a light source in an imaging scene.

(3) Scene brightness describes a luminance degree of an entire environment used during imaging. The scene brightness is related to lighting parameters of various light sources during imaging, such as luminous intensity and an amount of light, and may be determined by detecting a lighting parameter of a light source, such as luminous intensity.

(4) A reference color card data set stores a plurality of reference color card images and related parameter information used during imaging of each reference color card image. The reference color card images may be color card images obtained by photographing a standard color card in different environments. When the standard color card is photographed, related parameter information used during imaging of a color card image needs to be determined, for example, luminous intensity of a light source, a light source color temperature, and scene brightness. Related parameters during imaging of an image are affected by different environments, obtaining different color card images obtained through photographing.

(5) A standard color card image is a unified color card image used for color selection and comparison. A color of the standard color card image is a color obtained after impact of an imaging environment is removed.

(6) Color calibration information is information determined based on a standard color card image and a calibration color card image. The color calibration information is determined based on a relationship between colors of image blocks in each same position of the two color card images.

(7) A color value may be expressed by an LAB (color model) value or an RGB (red-green-blue color pattern) value. However, the color value is not limited to the two color values, and any color space that can represent a color is applicable to expression of the color value in the embodiments of the present invention.

(8) Image brightness is a physical quantity that describes a luminance degree of an image. The image brightness may be expressed by an average value obtained by performing mean processing on brightness values of all pixels of the image, or may be expressed by an image brightness value in a main region of the image. Any value that can represent the luminance degree of the image can be used as the image brightness in the embodiments of the present invention.

(9) "A plurality of" means at least two.

A color detection solution in the embodiments of this application may be applied to various terminals. The terminals include but are not limited to a personal computer, a server computer, a handheld or laptop device, a mobile device (for example, a mobile phone, a mobile telephone, a tablet computer, a personal digital assistant, or a media player), a consumer electronic device, a small-sized computer, and a large-sized computer. The following uses a mobile phone as an example to describe in detail the solution provided in the embodiments of this application. A specific structural composition of the mobile phone is simply described first.

FIG. 1 is a schematic diagram of a hardware structure of a mobile phone applied to an embodiment of this application. As shown in FIG. 1, the mobile phone 100 includes a display device 110, a processor 120, and a memory 130. The memory 130 may be configured to store a software program and data. By running the software program and the data that are stored in the memory 130, the processor 120 performs various function applications of the mobile phone 100 and processes data. The memory 130 may mainly include a program storage area and a data storage area. The program storage area may store an operating system, an application program required by at least one function (for example, an image collection function), and the like. The data storage area may store data. (for example, audio data, a phone book, an exchangeable image file EXIF, and a reference color card data set) created according to use of the mobile phone 100, and the like. In addition, the memory 130 may include a high-speed random access memory, and may further include a non-volatile memory, for example, at least one magnetic disk storage device, a flash memory device, or another volatile solid-state storage device. The processor 120 is a control center of the mobile phone 100, and is connected to all components of the entire mobile phone by using all types of interfaces and lines. By running or executing the software program and/or data stored in the memory 130, the processor 120 performs functions of the mobile phone 100 and processes the data, so as to perform overall monitoring on the mobile phone. The processor 120 may include one or more general-purpose processors, may include one or more DSPs (digital signal processor, digital signal processor), or may include one or more ISPs (image signal processor, image signal processor), and is configured to perform related operations to implement the technical solutions provided in the embodiments of this application.

The mobile phone 100 may further include a camera 160 configured to take an image or a video. The camera 160 may be a common camera or a focusing camera.

The mobile phone 100 may further include an input device 140, configured to receive entered numeral information, character information, or contact touch operations/noncontact gestures, generate signal input related to user setting and function control of the mobile phone 100, and the like. Specifically, in this embodiment of this application, the input device 140 may include a touch panel 141. The touch panel 141, also referred to as a touchscreen, may collect a touch operation performed by a user on or near the touch panel 141 (such as an operation performed by the user on or near the touch panel 141 by using a finger or any proper object or accessory such as a stylus), and drive a corresponding connection apparatus according to a preset program. Optionally, the touch panel 141 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch point coordinates, and sends the touch point coordinates to the processor 120, and can receive and execute a command sent by the processor 120. For example, the user taps, on the touch panel 141 with a finger, an icon, a legend, or the like that is used to start color detection. The touch detection apparatus detects a signal brought by the tap and then transfers the signal to the touch controller. The touch controller converts the signal into coordinates and sends the coordinates to the processor 120. The processor 120 determines, based on the coordinates and a type of the signal (a tap or a double tap), an operation (starting) performed on the icon or the legend.

The touch panel 141 may be implemented in various types, such as a resistive type, a capacitive type, an infrared type, and a surface acoustic wave type. In addition to the touch panel 141, the input device 140 may further include another input device 142. The another input device 142 may include but is not limited to one or more of the following: a physical keyboard, a function key (such as a volume control key or an on/off key), a trackball, a mouse, a joystick, and the like.

A display panel 111 included in the display device 110 is configured to display information entered by the user or information provided for the user, various menu interfaces of the mobile phone 100, and the like. In this embodiment of this application, the display panel 111 is mainly configured to display a to-be-detected image obtained by the camera or a sensor of the mobile phone 100. Optionally, the display panel 111 may be configured in a form such as a liquid crystal display (Liquid Crystal Display, LCD), or an OLED (organic light-emitting diode, organic light-emitting diode). In other embodiments, the touch panel 141 may cover the display panel 111 to form a touch display screen.

In addition, the mobile phone 100 may further include a power supply 150 configured to supply power to other modules. The mobile phone 100 may further include one or more sensors 170, for example, an image sensor, a brightness sensor, a color temperature sensor, a light sensor, a GPS sensor, an infrared sensor, a laser sensor, a position sensor, or a lens pointing angle sensor. The mobile phone 100 may further include a radio frequency (radio frequency, RF) circuit 180 configured to perform network communication with a wireless network device, and may further include a Wi-Fi module 190 configured to perform Wi-Fi communication with another device to obtain an image, data, or the like that is transmitted by the another device.

Figure 2:
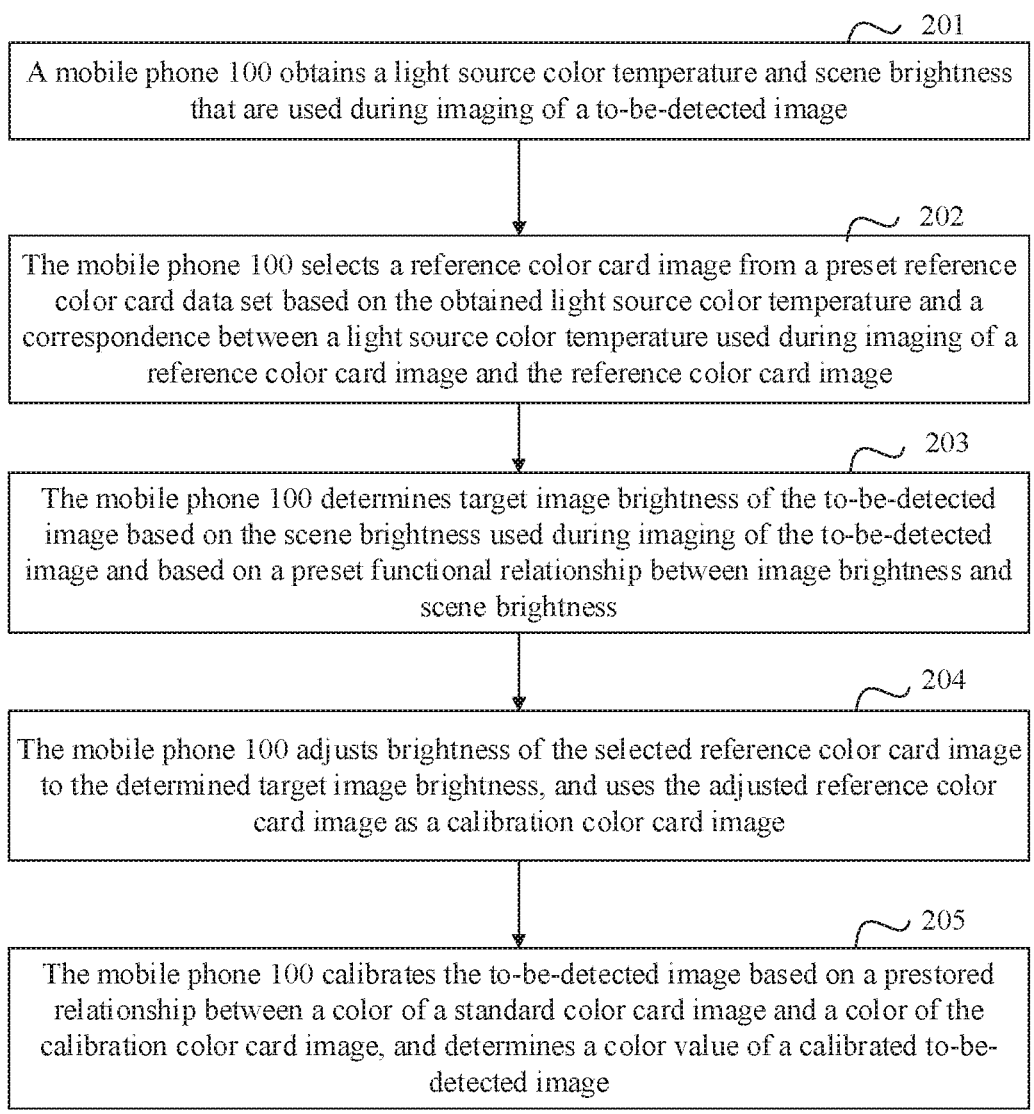
FIG. 2 is a flowchart of a color detection method according to an embodiment of this application.

An embodiment of this application provides a color detection method. The method is applicable to the mobile phone 100 shown in FIG. 1. Therefore, in this embodiment of this application, only the mobile phone 100 is used as an example for description, but no limitation is imposed on application of this embodiment of the present invention to another type of terminal. Referring to FIG. 2, a specific process of the method includes the following steps.

Step 201: The mobile phone 100 obtains a light source color temperature and scene brightness that are used during imaging of a to-be-detected image.

The mobile phone 100 may obtain the to-be-detected image before obtaining the light source color temperature and the scene brightness that are used during imaging of the to-be-detected image, or may obtain the to-be-detected image simultaneously while obtaining the light source color temperature and the scene brightness that are used during imaging of the to-be-detected image.

The mobile phone 100 may prestore the to-be-detected image in a memory, and obtain the to-be-detected image from the memory of the mobile phone 100 when the to-be-detected image needs to be processed; or obtain the to-be-detected image through photographing performed by using a camera of the mobile phone 100; or obtain the to-be-detected image by using an image sensor of the mobile phone 100; or obtain the to-be-detected image by receiving an image signal sent by another device and processing the image signal by using an ISP.

The mobile phone 100 may obtain the scene brightness and the light source color temperature used during imaging of the to-be-detected image by using a sensor that is of the mobile phone 100 and that has a detection function, for example, a light sensor or a color temperature sensor; or receive the scene brightness and the light source color temperature used during imaging of the to-be-detected image that are detected and transmitted as data by another device having a detection function.

It should be noted that, to improve color detection accuracy, the light source color temperature and the scene brightness that are used during imaging of the to-be-detected image need to be obtained. In this way, a real color of the to-be-detected image can be restored to a greatest extent when the light source color temperature and the scene brightness are subsequently used to calibrate the to-be-detected image.

Step 202: The mobile phone 100 selects a reference color card image from a preset reference color card data set based on the obtained light source color temperature and a correspondence between a light source color temperature used during imaging of a reference color card image and the reference color card image.

The mobile phone 100 may prestore the correspondence between a light source color temperature used during imaging of a reference color card image and the reference color card image; and during color detection, select the reference color card image by using the stored correspondence between a light source color temperature used during imaging of a reference color card image and the reference color card image.

The mobile phone 100 may alternatively obtain the correspondence between a light source color temperature used during imaging of a reference color card image and the reference color card image immediately during color detection, and select the reference color card image by using the obtained correspondence between a light source color temperature used during imaging of a reference color card image and the reference color card image.

The reference color card data set may store reference color card images obtained in a plurality of environments and corresponding related parameter information used during imaging of the reference color card images. FIG. 3 is a schematic structural diagram of a reference color card data set. The reference color card data set records a light source type, a light source color temperature, and scene brightness in an environment used during imaging of each reference color card image, and data about the reference color card image. For example, when a light source is candlelight, a color temperature is 1000 K (Kelvin temperature); when scene brightness is brightness 1, a corresponding reference color card image is image 1; and so on.

It should be noted that the reference color card data set may be a data set of a table type or may be a mapping-relationship database. Any data set that can store the reference color card images and the related parameter information used during imaging of the images is applicable to this embodiment of the present invention.

Specifically, the reference color card data set may be stored in a local storage medium of the mobile phone 100, so that the mobile phone 100 can directly obtain the reference color card data set locally. The reference color card data set may alternatively be stored in a cloud platform or in a storage medium of another device, so that the mobile phone 100 can obtain the reference color card data set by communicating with the cloud platform or the another device.

The reference color card data set may include the light source color temperature used during imaging of each reference color card image; in this case, there is a one-to-one correspondence between light source color temperatures used during imaging of reference color card images and the reference color card images.

That the mobile phone 100 further selects a reference color card image from a reference color card data set based on the obtained light source color temperature and a correspondence between a light source color temperature used during imaging of a reference color card image and the reference color card image may be implemented in, but not limited to, the following two manners.

In manner 1, the mobile phone 100 selects, from the preset reference color card data set, a reference color card image for which a light source color temperature used during imaging of the reference color card image is closest to the obtained light source color temperature. Specifically, the mobile phone 100 first selects, from the reference color card data set, a light source color temperature closest to the obtained light source color temperature, and then selects a reference color card image corresponding to the light source color temperature. The reference color card data set shown in FIG. 3 is used as an example. When the obtained light source color temperature is 2600 K, the light source color temperature 2500 K closest to 2600 K may be selected, and then a reference color card image corresponding to the light source color temperature 2500 K, namely, image 3, is selected.

In manner 2, the mobile phone 100 selects, from the preset reference color card data set, at least one reference color card image, and selects one reference color card image from the at least one reference color card image, where a difference between a light source color temperature used during imaging of the at least one reference color card image and the obtained light source color temperature is within a specified threshold range.

When selecting a reference color card image, the mobile phone 100 may preset a threshold, and then determine at least one reference color card image in the reference color card data set, There a difference between a light source color temperature of the at least one reference color card image and the obtained light source color temperature is within the threshold range. If determining that there is one reference color card image, the mobile phone 100 directly selects the reference color card image. The reference color card data set shown in FIG. 3 is used as an example. When the obtained light source color temperature is 3000 K, if a threshold set by the mobile phone 100 is 200 K, the light source color temperature 3200 K with a difference from 3000 K falling within a range of 200 K is selected, and a reference color card image selected accordingly is image 4. If determining that there is more than one reference color card image, the mobile phone 100 selects one of the plurality of determined reference color card images. The reference color card data set shown in FIG. 3 is still used as an example. When the obtained light source color temperature is 5700 K, if a threshold set by the mobile phone 100 is 500 K, light source color temperatures with differences from 5700 K falling within a range of 500 K are selected, including 5000 K, 5500 K, 5600 K, and 6000 K that are respectively corresponding to reference color card images 10, 11, 12, and 13. One reference color card image may be selected from images 10, 11, 12, and 13 randomly or according to a specified rule.

When the reference color card image is selected from the plurality of determined reference color card images according to a specified rule, a reference color card image for which a light source color temperature used during imaging of the reference color card image is greater than the obtained light source color temperature may be selected, or a reference color card image for which a light source color temperature used during imaging of the reference color card image is less than the obtained light source color temperature may be selected. A selection manner is not limited to any one of the foregoing listed selection manners, and a specific selection manner may be determined based on a specific scenario.

Step 203: The mobile phone 100 determines target image brightness of the to-be-detected image based on the scene brightness used during imaging of the to-be-detected image and based on a preset functional relationship between image brightness and scene brightness.

In the image processing field, the scene brightness affects the image brightness. That is, there is a direct relationship between the image brightness and the scene brightness. Herein, the functional relationship between image brightness and scene brightness may be first obtained by performing statistical analysis on a large quantity of relationships between image brightness and scene brightness in advance.

The functional relationship between image brightness and scene brightness may be prestored in the mobile phone 100, or may be stored in another device or the cloud platform. When the mobile phone 100 needs to use the functional relationship, the mobile phone 100 may obtain the functional relationship by communicating with the another device or the cloud platform.

In an optional implementation, the mobile phone 100 may store, in the reference color card data set shown in FIG. 3, scene brightness used during imaging of various reference color card images and image brightness of the reference color card images, and further obtain the functional relationship between image brightness and scene brightness by analyzing a correspondence between scene brightness used during imaging of each reference color card image in the reference color card data set and image brightness of each reference color card image in the reference color card data set.

For example, the image brightness of each reference color card image and the scene brightness that is used during imaging of the reference color card image and that is corresponding to the image brightness are analyzed, and the functional relationship between image brightness and scene brightness that is calculated by using a linear regression algorithm is Y=0.5X+2, where Y is image brightness of a reference color card image and X is scene brightness used during imaging of the reference color card image.

The mobile phone 100 may substitute the scene brightness used during imaging of the to-be-detected image into the functional relationship between image brightness and scene brightness, obtain image brightness corresponding to the scene brightness used during imaging of the to-be-detected image, and use the obtained image brightness as the target image brightness of the to-be-detected image.

Step 204: The mobile phone 100 adjusts brightness of the selected reference color card image to the determined target image brightness, and uses an adjusted reference color card image as a calibration color card image.

For example, the functional relationship between image brightness and scene brightness is Y=0.5X+2, and when the scene brightness that is obtained in step 201 and that is used imaging of the to-be-detected image is 100 lux (Lux), the reference color card image selected in step 203 is image 3. 100 lux may be substituted into Y=0.5X+2, and obtained target image brightness is 52. In this case, brightness of image 3 is adjusted to 52, and image 3 obtained after brightness adjustment is used as the calibration color card image.

Step 205: The mobile phone 100 calibrates the to-be-detected image based on a prestored relationship between a color of a standard color card image and a color of the calibration color card image, and determines a color value of a calibrated to-be-detected image.

Specifically, the mobile phone 100 may determine color calibration information based on, but not limited to, a color value of a color block in each same position of the prestored standard color card image and the calibration color card image, where the color calibration information is used to represent a mapping relationship between a color value of the standard color card image and a color value of the calibration color card image; and the mobile phone 100 calibrates a color of the to-be-detected image based on the color calibration information.

The calibration color card image obtained in step 204 is a color card image related to the light source color temperature and the imaging brightness that are used during imaging of the to-be-detected image. There is a difference between a color of a color block in the calibration color card image and a color of a color block in the standard color card image. The mobile phone 100 may determine the color calibration information based on the color value of the color block in each same position of the standard color card image and the calibration color card image.

In specific implementation, the mobile phone 100 may use a matrix to indicate a color of a color card image. Values of elements in the matrix may indicate color values of color blocks in the color card image, or may indicate color values of pixels of the color card image. Then the color calibration information is determined by performing a matrix operation.

The elements used to indicate the color of the color card image in the matrix may be LAB values of the pixels of the color card image, or may be RGB values of the pixels of the color card image. Similarly, the color of the to-be-detected image may also be indicated in a same manner, to be specific, by using a matrix.

Specifically, the Color Calibration Information May be Obtained in the Following Manner:

Assuming that a matrix used to indicate the color of the calibration color card image is P, a matrix used to indicate the color of the standard color card image is O, and the matrix used to indicate the color of the to-be-detected image is C, the color calibration information T may be obtained by using the following formula:

$$P*T=O$$

After the color calibration information T is determined, the to-be-detected image may be calibrated by using a formula C*T. A color of the calibrated to-be-detected image is closer to a real color.

Optionally, after calibrating the to-be-detected image, the mobile phone 100 determines the color value of the calibrated to-be-detected image based on a color value of each pixel of the calibrated to-be-detected image.

If the mobile phone 100 only needs to determine color values of some regions in the to-be-determined image, the mobile phone 100 may first determine a region whose color value needs to be determined in the to-be-detected image; and the mobile phone 100 processes color values of pixels in the determined region, and determines the color value in the region of the calibrated to-be-detected image.

The mobile phone 100 may obtain an average value of the color values of the pixels in the region, and use the average value as the color value. Alternatively, the mobile phone 100 may discard a color value less than a threshold in the color values of the pixels in the region, obtain an average value of color values of remaining pixels, and use the average value as the color value.

A processing manner of the color values of the pixels in the region is not limited to the foregoing two manners, and any manner in which the color value can be obtained is applicable to this embodiment of the present invention.

It should be noted that if the mobile phone 100 only needs to determine color values of some regions in the to-be-detected image, the mobile phone 100 needs to perform a region selection operation on the to-be-detected image. For example, the mobile phone 100 may select a region through facial identification or complexion region selection; or may select a region based on an operation performed by a user on a touch panel. The region selection operation may be performed after or before the to-be-detected image is calibrated.

If the region selection operation is performed before the to-be-detected image is calibrated, the mobile phone 100 may calibrate an image only in the selected region when calibrating the to-be-detected image, to reduce unnecessary calibration operations and further improve color detection efficiency.

According to the color detection method provided in this embodiment of this application, when processing the to-be-detected image, a terminal determines the calibration color card image based on the light source color temperature and the scene brightness that are used during imaging of the to-be-detected image, and calibrates the to-be-detected image based on the relationship between the color of the standard color card image and the color of the calibration color card image, to restore the real color of the to-be-detected image to a greatest extent, so that a final color value is closer to a real value and accuracy of color detection can be effectively improved. In the entire color detection process, the terminal only needs to determine the light source color temperature and the scene brightness that are used during imaging of the to-be-detected image, to complete calibration of the to-be-detected image, and the user does not need to prepare a color card, thereby improving convenience in color detection.

Figure 4:
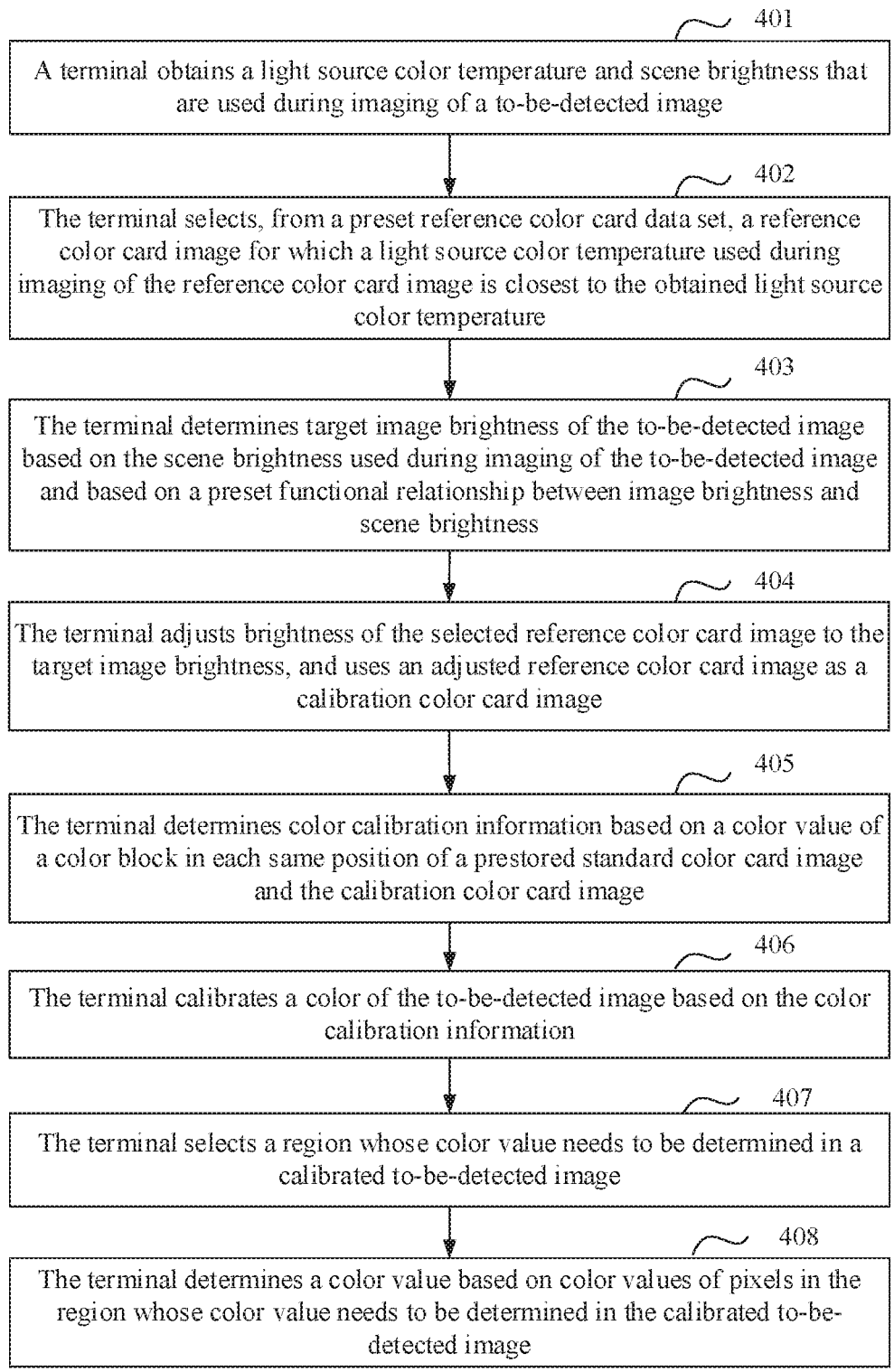
FIG. 4 is a flowchart of a color detection example according to an embodiment of this application.

Based on the Foregoing Embodiment, as Shown FIG. 4, an Embodiment of this Application Provides a Color Detection Method. The Method Includes the Following Steps:

Step 401: A terminal obtains a light source color temperature and scene brightness that are used during imaging of a to-be-detected image.

Step 402: The terminal selects, from a preset reference color card data set, a reference color card image for which a light source color temperature used during imaging of the reference color card image is closest to the obtained light source color temperature.

Step 403: The terminal determines target image brightness of the to-be-detected image based on the scene brightness used during imaging of the to-be-detected image and based on a preset functional relationship between image brightness and scene brightness.

Step 404: The terminal adjusts brightness of the selected reference color card image to the target image brightness, and uses an adjusted reference color card image as a calibration color card image.

Step 405: The terminal determines color calibration information based on a color value of a color block in each same position of a prestored standard color card image and the calibration color card image.

Step 406: The terminal calibrates a color of the to-be-detected image based on the color calibration information.

Step 407: The terminal selects a region whose color value needs to be determined in a calibrated to-be-detected image.

Step 408: The terminal determines the color value based on color values of pixels in the region whose color value needs to be determined in the calibrated to-be-detected image.

Figure 5:
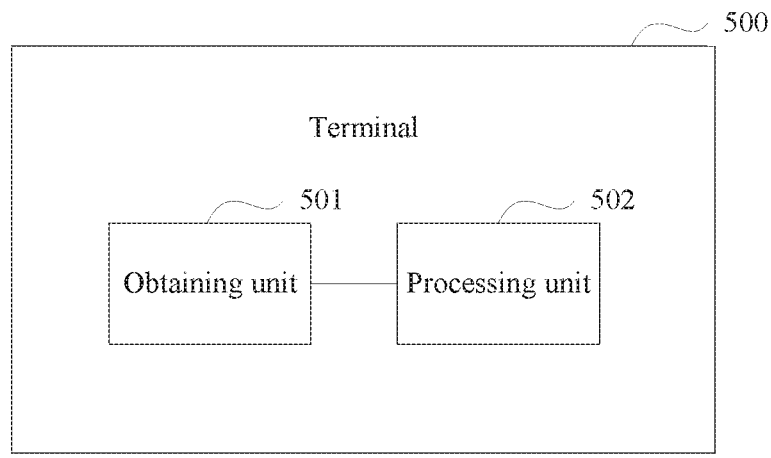
FIG. 5 is a schematic structural diagram of a color detection terminal according to an embodiment of this application.

Based on the foregoing embodiments, an embodiment of this application further provides a terminal. The terminal is configured to implement the color detection method performed by the terminal in FIG. 2. Referring to FIG. 5, the terminal 500 includes an obtaining unit 501 and a processing unit 502.

The obtaining unit 501 is configured to obtain a light source color temperature and scene brightness that are used during imaging of a to-be-detected image.

The processing unit 502 is configured to: select a reference color card image from a preset reference color card data set in the terminal based on the obtained light source color temperature and a correspondence between a light source color temperature used during imaging of a reference color card image and the reference color card image;

determine target image brightness of the to-be-detected image based on the scene brightness used during imaging of the to-be-detected image and based on a preset functional relationship between image brightness and scene brightness;

adjust brightness of the selected reference color card image to the target image brightness, and use an adjusted reference color card image as a calibration color card image; and calibrate the to-be-detected image based on a prestored relationship between a color of a standard color card image and a color of the calibration color card image, and determine a color value of a calibrated to-be-detected image.

Optionally, the Processing Unit 502 is Specifically Configured to:

select, from the preset reference color card data set, a reference color card image for which a light source color temperature used during imaging of the reference color card image is closest to the obtained light source color temperature; or select, from the preset reference color card data set, at least one reference color card image, and select one reference color card image from the at least one reference color card image, where a difference between a light source color temperature used during imaging of the at least one reference color card image and the obtained light source color temperature is within a specified threshold range.

Optionally, the preset functional relationship between image brightness and scene brightness is obtained by analyzing a correspondence between scene brightness used during imaging of each reference color card image in the preset reference color card data set and image brightness of each reference color card image in the preset reference color card data set.

Optionally, the Processing Unit 502 is Specifically Configured to:

determine color calibration information based on a color value of a color block in each same position of the prestored standard color card image and the calibration color card image, where the color calibration information represents a mapping relationship between a color value of the standard color card image and a color value of the calibration color card image; and calibrate a color of the to-be-detected image based on the color calibration information.

Optionally, the Processing Unit 502 is Specifically Configured to:

determine the color value of the calibrated to-be-detected image based on a color value of each pixel of the calibrated to-be-detected image.

It should be noted that the unit division in the embodiments of this application is an example, and is merely logical function division. There may be another division manner during actual implementation. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The storage medium includes any medium that can store program code, such as a USB flash drive, a removable hard disk, a read-only memory (read-only memory, ROM), a random access memory(random access memory, RAM), a magnetic disk, or an optical disc.

Figure 6:
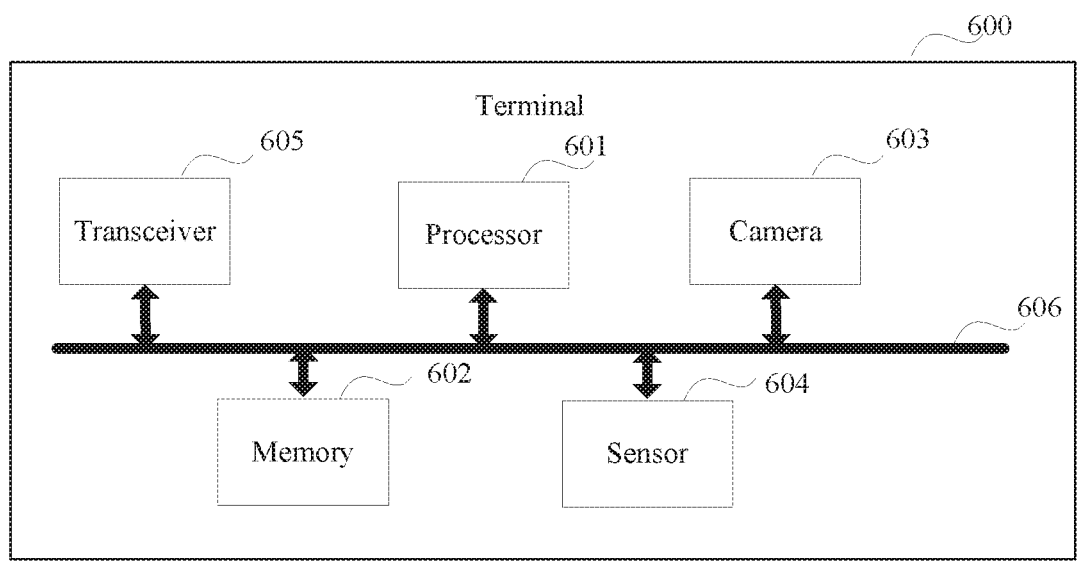
FIG. 6 is a schematic structural diagram of a color detection terminal according to an embodiment of this application.

Based on the foregoing embodiments, an embodiment of this application further provides a terminal. The terminal is configured to implement the color detection method performed by the terminal in FIG. 2, Referring to FIG. 6, the terminal 600 includes a processor 601 and a memory 602.

The memory 602 is configured to store a reference color card data set.

Optionally, the terminal may further include a camera 603 and a sensor 604.

The camera 603 is configured to obtain a to-be-detected image through photographing.

The sensor 604 is configured to detect a light source color temperature and scene brightness that are used during imaging of the to-be-detected image.

The memory 602 may alternatively store a to-be-detected image, and a light source color temperature and scene brightness that are used during imaging of the to-be-detected image, so that the processor 601 obtains required data from the memory 602.

Optionally, the terminal may further include a transceiver 605.

The transceiver 605 is configured to receive data and store the received data in the memory 602. The received data includes all or some of the following data: the to-be-detected image, the reference color card data set, and the light source color temperature and the scene brightness that are used during imaging of the to-be-detected image.

The Processor 601 is Configured to Implement the Color Detection Method Performed by the Terminal in FIG. 2, Including:

obtaining the light source color temperature and the scene brightness that are used during imaging of the to-be-detected image;

selecting a reference color card image from the preset reference color card data set in the terminal based on the obtained light source color temperature and a correspondence between a light source color temperature used during imaging of a reference color card image and the reference color card image;

determining target image brightness of the to-be-detected image based on the scene brightness used during imaging of the to-be-detected image and based on a preset functional relationship between image brightness and scene brightness;

adjusting brightness of the selected reference color card image to the target image brightness, and using an adjusted reference color card image as a calibration color card image; and calibrating the to-be-detected image based on a prestored relationship between a color of a standard color card image and a color of the calibration color card image, and determining a color value of a calibrated to-be-detected image.

Optionally, the Processor 601 is Specifically Configured to:

select, from the preset reference color card data set, a reference color card image for which a light source color temperature used during imaging of the reference color card image is closest to the obtained light source color temperature; or select, from the preset reference color card data set, at least one reference color card image, and select one reference color card image from the at least one reference color card image, where a difference between a light source color temperature used during imaging of the at least one reference color card image and the obtained light source color temperature is within a specified threshold range.

Optionally, the preset functional relationship between image brightness and scene brightness is obtained by analyzing a correspondence between scene brightness used during imaging of each reference color card image in the preset reference color card data set and image brightness of each reference color card image in the preset reference color card data set.

Optionally, the Processor 601 is Specifically Configured to:

determine color calibration information based on a color value of a color block in each same position of the prestored standard color card image and the calibration color card image, where the color calibration information represents a mapping relationship between a color value of the standard color card image and a color value of the calibration color card image; and calibrate a color of the to-be-detected image based on the color calibration information.

Optionally, the processor 601 determines the color value of the calibrated to-be-detected image based on a color value of each pixel of the calibrated to-be-detected image.

The memory 602 is further configured to store a program and the like. Specifically, the program may include program code, and the program code includes a computer operation instruction. The memory 602 may include a RAM, and may further include a non-volatile memory (non-volatile memory), for example, at least one disk memory. The processor 601 executes an application program stored in the memory 602, to implement the foregoing functions, so as to implement the color detection method performed by the terminal in FIG. 2.

The processor 601 and the memory 602 are connected to each other. Optionally, the processor 601 and the memory 602 may be connected to each other by using a bus 606 shown in FIG. 6. The bus 606 may be a peripheral component interconnect (peripheral component interconnect, PCI) bus, an extended industry standard architecture (extended industry standard architecture, EISA) bus, or the like. The bus may be categorized as an address bus, a data bus, a control bus, or the like. For ease of representation, the bus is indicated by using only one bold line in FIG. 6. However, it does not indicate that there is only one bus or only one type of bus.

Optionally, the terminal 600 may further include the camera 603 and the sensor 604 that are mutually connected to the processor 601 and the memory 602.

Optionally, the terminal 600 may further include the transceiver 605 that is mutually connected to the processor 601 and the memory 602.

In conclusion, the embodiments of this application provide the color detection method and terminal. In the method, the terminal obtains the light source color temperature and the scene brightness that are used during imaging of the to-be-detected image; the terminal selects the reference color card image from the preset reference color card data set preset in the terminal based on the obtained light source color temperature and the correspondence between a light source color temperature used during imaging of a reference color card image and the reference color card image; the terminal determines the target image brightness of the to-be-detected image based on the scene brightness used during imaging of the to-be-detected image and based on the preset functional relationship between image brightness and scene brightness; the terminal adjusts the brightness of the selected reference color card image to the target image brightness, and uses the adjusted reference color card image as the calibration color card image, so that the selected calibration color card is related to an imaging environment of the to-be-detected image; and then the terminal calibrates the to-be-detected image based on the prestored relationship between the color of the standard color card image and the color of the calibration color card image, to restore a real color of the to-be-detected image, and determines the color value of the calibrated to-be-detected image, so that the finally determined color value is also closer to a real value. In the entire color detection process, no additional operations such as preparing a color card need to be performed by a user, thereby improving convenience in color detection.

A person skilled in the au should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product implemented on one or more computer-usable storage media (including but not limited to a disk memory, a CD-ROM, and an optical memory) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function specified in one or more processes in the flowcharts and/or specified in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a function specified in one or more processes in the flowcharts and/or specified in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function specified in one or more processes in the flowcharts and/or specified in one or more blocks in the block diagrams.

Obviously, a person skilled in the art can make various modifications and variations to the embodiments of this application without departing from the spirit and scope of the embodiments of the present invention. This application is intended to cover these modifications and variations provided that they fall within the scope of protection defined by the following claims and their equivalent technologies.

What is claimed is:

1. A method implemented by a terminal, the method comprising:
   obtaining a first light source color temperature and a first scene brightness that are used during imaging of a to-be-detected image;
   selecting a reference color card image from a preset reference color card data set based on the first light source color temperature and a correspondence between the reference color card image and a second light source color temperature used during imaging of the reference color card image, wherein the preset reference color card data set stores a plurality of reference color card images and related parameter information used during imaging of each of the reference color card images;
   determining target image brightness of the to-be-detected image based on the first scene brightness and based on a preset functional relationship between image brightness and scene brightness;
   adjusting a brightness of the reference color card image to the target image brightness to obtain an adjusted reference color card image;
   setting the adjusted reference color card image as a calibration color card image;
   calibrating the to-be-detected image based on a prestored relationship between a color of a standard color card image and a color of the calibration color card image to obtain a calibrated image; and
   determining a color value of the calibrated image.

2. The method of claim 1, wherein selecting the reference color card image comprises selecting, from the reference color card images, a first reference color card image for which a third light source color temperature used during imaging of the first reference color card image is closest to the first light source color temperature.

3. The method of claim 1, wherein selecting the reference color card image from comprises:
   selecting, from the reference color card images, at least one reference color card image, wherein a difference between a third light source color temperature used during imaging of the at least one reference color card image and the first light source color temperature is within a specified threshold range; and
   selecting one reference color card image from the at least one reference color card image as the reference color card image.

4. The method of claim 1, further comprising analyzing a correspondence between a scene brightness used during imaging of each of the reference color card images and an image brightness of each of the reference color card images to obtain the preset functional relationship.

5. The method of claim 1, wherein calibrating the to-be-detected image comprises:
   determining color calibration information based on a color value of a color block in each same position of the standard color card image and the calibration color card image, wherein the color calibration information represents a mapping relationship between a color value of the standard color card image and a color value of the calibration color card image; and
   calibrating a color of the to-be-detected image based on the color calibration information.

6. The method of claim 1, wherein determining the color value of the calibrated image comprises determining the color value of the calibrated image based on a color value of each pixel of the calibrated image.

7. An electronic device, comprising:
   a non-transitory memory configured to store instructions; and
   a processor coupled to the non-transitory memory and configured to execute the instructions to cause the electronic device to:
      obtain a first light source color temperature and a first scene brightness that are used during imaging of a to-be-detected image;
      select a reference color card image from a preset reference color card data set based on the first light source color temperature and a correspondence between the reference color card image and a second light source color temperature used during imaging of the reference color card image, wherein the preset reference color card data set stores a plurality of reference color card images and related parameter information used during imaging of each of the reference color card images;

determine target image brightness of the to-be-detected image based on the first scene brightness and on a preset functional relationship between image brightness and scene brightness;

adjust a brightness of the reference color card image to the target image brightness to obtain an adjusted reference color card image;

set the adjusted reference color card image as a calibration color card image;

calibrate the to-be-detected image based on a prestored relationship between a color of a standard color card image and a color of the calibration color card image to obtain a calibrated image; and determine a color value of the calibrated image.

8. The electronic device of claim 7, wherein the processor is further configured to execute the instructions to cause the electronic device select, from the preset reference color card data set, a first reference color card image for which a third light source color temperature used during imaging of the first reference color card image is closest to the first light source color temperature.

9. The electronic device of claim 7, wherein the processor is further configured to execute the instructions to cause the electronic device to:

select, from the reference color card images, at least one reference color card image, wherein a difference between a third light source color temperature used during imaging of the at least one reference color card image and the first light source color temperature is within a specified threshold range; and select one reference color card image from the at least one reference color card image as the reference color card image.

10. The electronic device of claim 7, wherein the processor is further configured to execute the instructions to cause the electronic device to analyze a correspondence between a scene brightness used during imaging of each of the reference color card images and an image brightness of each of the reference color card images.

11. The electronic device of claim 7, wherein the processor is further configured to execute the instructions to cause the electronic device to:

determine color calibration information based on a color value of a color block in each same position of the standard color card image and the calibration color card image, wherein the color calibration information represents a mapping relationship between a color value of the standard color card image and a color value of the calibration color card image; and calibrate a color of the to-be-detected image based on the color calibration information.

12. The electronic device of claim 7, wherein the processor is further configured to execute the instructions to cause the electronic device to determine the color value of the calibrated image based on a color value of each pixel of the calibrated image.

13. A computer program product comprising computer-executable instructions for storage on a non-transitory computer-readable medium that, when executed by a processor, cause a terminal to:

obtain a first light source color temperature and a first scene brightness that are used during imaging of a to-be-detected image;

select a reference color card image from a preset reference color card data set based on the first light source color temperature and a correspondence between the reference color card image and a second light source color temperature used during imaging of the reference color card image, wherein the preset reference color card data set stores a plurality of reference color card images and related parameter information used during imaging of each of the reference color card images;

determine target image brightness of the to-be-detected image based on the first scene brightness used and on a preset functional relationship between image brightness and scene brightness;

adjust a brightness of the reference color card image to the target image brightness to obtain an adjusted reference color card image;

set the adjusted reference color card image as a calibration color card image;

calibrate the to-be-detected image based on a prestored relationship between a color of a standard color card image and a color of the calibration color card image to obtain a calibrated image; and determine a color value of the calibrated image.

14. The computer program product of claim 13, wherein the computer-executable instructions further cause the terminal to select, from the preset reference color card data set, a first reference color card image for which a third light source color temperature used during imaging of the first reference color card image is closest to the first light source color temperature.

15. The computer program product of claim 13, wherein the computer-executable instructions further cause the terminal to:

select, by the terminal from the reference color card images, at least one reference color card image, wherein a difference between a third light source color temperature used during imaging of the at least one reference color card image and the first light source color temperature is within a specified threshold range; and select one reference color card image from the at least one reference color card image as the reference color card image.

16. The computer program product of claim 13, wherein the computer-executable instructions further cause the terminal to analyze a correspondence between a scene brightness used during imaging of each of the reference color card images and an image brightness of each of the reference color card images.

17. The computer program product of claim 13, wherein the computer-executable instructions further cause the terminal to:

determine color calibration information based on a color value of a color block in each same position of the standard color card image and the calibration color card image, wherein the color calibration information represents a mapping relationship between a color value of the standard color card image and a color value of the calibration color card image; and calibrate a color of the to-be-detected image based on the color calibration information.

18. The computer program product of claim 13, wherein the computer-executable instructions further cause the terminal to determine the color value of the calibrated image based on a color value of each pixel of the calibrated image.

19. The computer program product of claim 13, wherein before obtaining the first light source color temperature and the first scene brightness, the computer-executable instructions further cause the terminal to obtain the to-be-detected image from a memory of the terminal or via photographing using the terminal.

20. The computer program product of claim 13, wherein before obtaining the first light source color temperature and the first scene brightness, the computer-executable instructions further cause the terminal to obtain the to-be-detected image from an image sensor of the terminal or from a received image signal.

\* \* \* \* \*

UNITED STATES PATENT AND TRADEMARK OFFICE
CERTIFICATE OF CORRECTION

PATENT NO. : 11,284,013 B2
APPLICATION NO. : 16/627636
DATED : March 22, 2022
INVENTOR(S) : Henghui Lu, Hao Liu and Wenmei Gao It is certified that error appears in the above-identified patent and that said Letters Patent is hereby corrected as shown below:

In the Claims

Claim 15, Column 20, Line 38: "select, by the terminal from the reference" should read "select, from the reference"

Signed and Sealed this
Twenty-fourth Day of May, 2022

Katherine Kelly Vidal
*Director of the United States Patent and Trademark Office*